(12) United States Patent
Kojima

(10) Patent No.: US 7,719,990 B2
(45) Date of Patent: May 18, 2010

(54) COMMUNICATIONS NETWORK TRAFFIC MONITOR SYSTEM

(75) Inventor: Tomoaki Kojima, Tokyo (JP)

(73) Assignee: NEC Corporation, Tokyo (JP)

( * ) Notice: Subject to any disclaimer, the term of this patent is extended or adjusted under 35 U.S.C. 154(b) by 1226 days.

(21) Appl. No.: 10/389,998

(22) Filed: Mar. 18, 2003

(65) Prior Publication Data

US 2003/0179705 A1    Sep. 25, 2003

(30) Foreign Application Priority Data

Mar. 22, 2002    (JP)    ............................ 2007-079957

(51) Int. Cl.
*H04L 12/28*    (2006.01)
(52) U.S. Cl. ...................................... 370/252; 370/412
(58) Field of Classification Search ................. 370/229, 370/231–235, 352–356, 394, 395.1, 397, 370/399, 409
See application file for complete search history.

(56) References Cited

U.S. PATENT DOCUMENTS

| | | | | |
|---|---|---|---|---|
| 4,692,917 A | * | 9/1987 | Fujioka ....................... | 370/392 |
| 4,769,810 A | * | 9/1988 | Eckberg et al. ............. | 370/232 |
| 4,956,839 A | * | 9/1990 | Torii et al. .................. | 370/232 |
| 4,964,119 A | * | 10/1990 | Endo et al. .................. | 370/237 |
| 5,394,396 A | * | 2/1995 | Yoshimura et al. .......... | 370/236 |
| 5,400,339 A | * | 3/1995 | Sekine et al. ................ | 370/398 |
| 5,416,771 A | * | 5/1995 | Iwata .......................... | 370/410 |
| 5,509,001 A | * | 4/1996 | Tachibana et al. ........... | 370/230 |
| 5,663,959 A | * | 9/1997 | Nakagawa ................ | 370/236.2 |
| 5,675,576 A | * | 10/1997 | Kalampoukas et al. ...... | 370/232 |
| 5,812,526 A | * | 9/1998 | Chang et al. ................. | 370/230 |
| 5,864,555 A | * | 1/1999 | Mathur et al. ............. | 370/236.2 |
| 5,867,481 A | * | 2/1999 | Miyagi ....................... | 370/244 |
| 5,875,177 A | * | 2/1999 | Uriu et al. ................... | 370/244 |
| 5,878,063 A | * | 3/1999 | Kawasaki et al. ........ | 370/395.1 |
| 5,949,757 A | * | 9/1999 | Katoh et al. ................ | 370/232 |
| 6,009,080 A | * | 12/1999 | Hanazawa ................... | 370/244 |
| 6,034,059 A | * | 3/2000 | Fryklund et al. ............. | 514/12 |
| 6,075,767 A | * | 6/2000 | Sakamoto et al. ........... | 370/228 |
| 6,141,323 A | * | 10/2000 | Rusu et al. ................... | 370/236 |
| 6,445,708 B1 | * | 9/2002 | Jones ........................ | 370/397 |
| 6,477,141 B1 | * | 11/2002 | Izawa et al. ................. | 370/219 |

(Continued)

FOREIGN PATENT DOCUMENTS

GB    2341292 A    *    3/2000

(Continued)

*Primary Examiner*—Ricky Ngo
*Assistant Examiner*—Phuongchau B Nguyen
(74) *Attorney, Agent, or Firm*—Young & Thompson

(57) ABSTRACT

First to N-th circuit interface units $104_1$ to $104_N$ corresponding to first to N-th circuits $103_1$ to $103_N$ include an input traffic counter unit $114_1$, etc. and an output traffic counter unit $115_1$, etc. for counting the traffic of input and output. A traffic counter monitor block 123 in a control unit 105 specifies an input traffic counter unit 114 and an output traffic counter unit 115 of two circuits 103 through a switch unit 102 in a specific packet flow, and periodically obtains the count values, based on which the utilization rate, the discard rate, etc. of the corresponding circuit 103 are obtained to monitor the traffic. This makes it possible to monitor packet signal traffic when a plurality of circuits are to be switched without capturing each packet signal.

4 Claims, 11 Drawing Sheets

U.S. PATENT DOCUMENTS

| | | | |
|---|---|---|---|
| 6,493,315 B1 * | 12/2002 | Richards et al. | 370/229 |
| 6,665,495 B1 * | 12/2003 | Aicklen et al. | 398/54 |
| 6,738,349 B1 * | 5/2004 | Cen | 370/231 |
| 6,768,741 B1 * | 7/2004 | Bandai et al. | 370/397 |
| 6,781,994 B1 * | 8/2004 | Nogami et al. | 370/395.1 |
| 6,804,198 B1 * | 10/2004 | Iwamoto | 370/235 |
| 6,839,328 B2 * | 1/2005 | Lau et al. | 370/252 |
| 7,075,928 B1 * | 7/2006 | Branth et al. | 370/390 |
| 7,139,282 B1 * | 11/2006 | Dyckerhoff et al. | 370/428 |
| 7,522,525 B2 * | 4/2009 | Mieno et al. | 370/235 |
| 2003/0227932 A1 * | 12/2003 | Meempat et al. | 370/415 |

FOREIGN PATENT DOCUMENTS

| | | |
|---|---|---|
| JP | 11-205386 | 7/1999 |
| JP | 2001-136204 | 5/2001 |

* cited by examiner

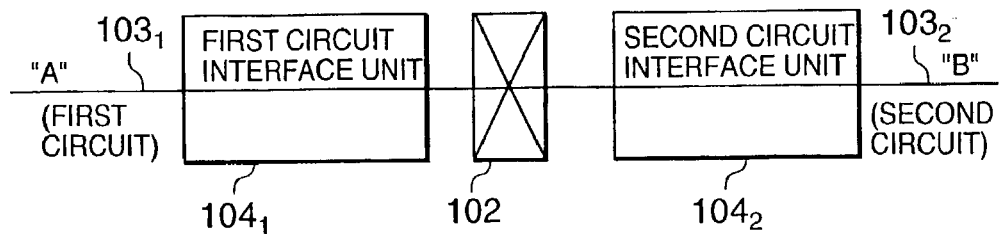
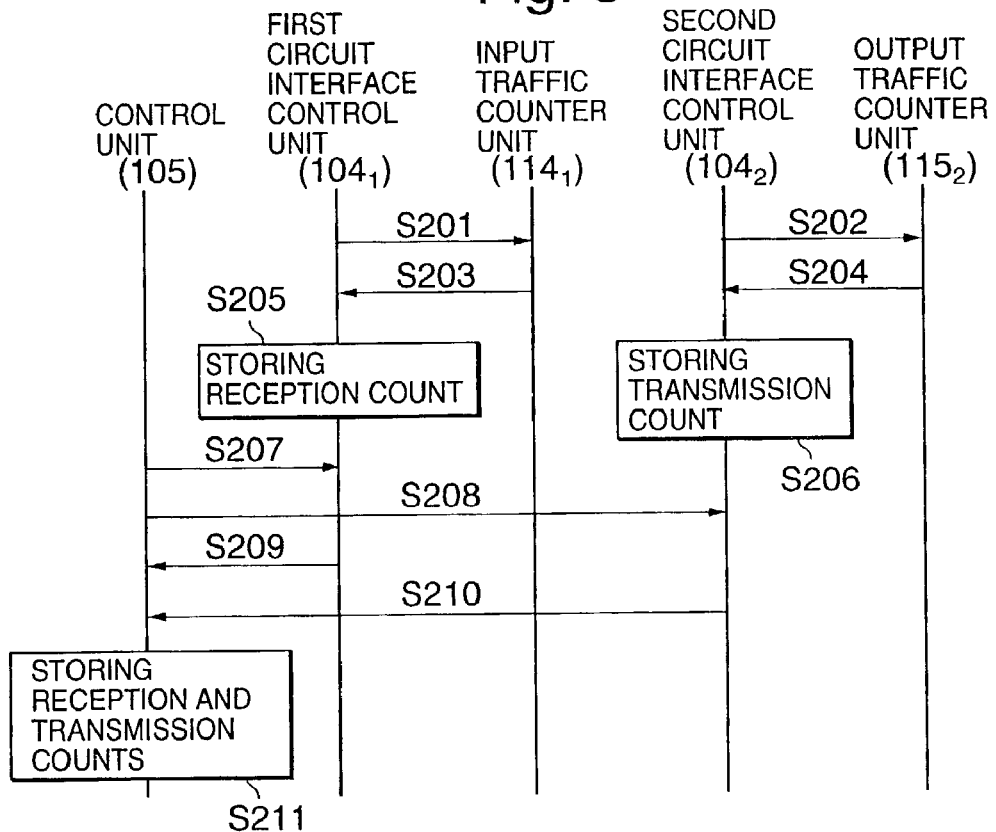
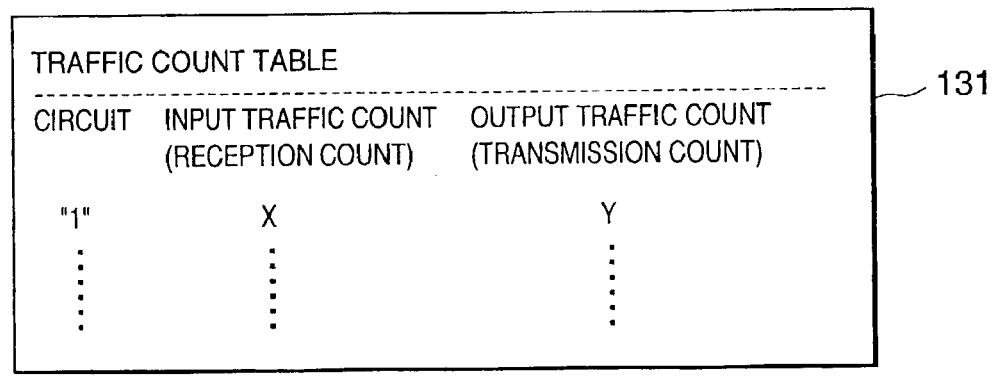

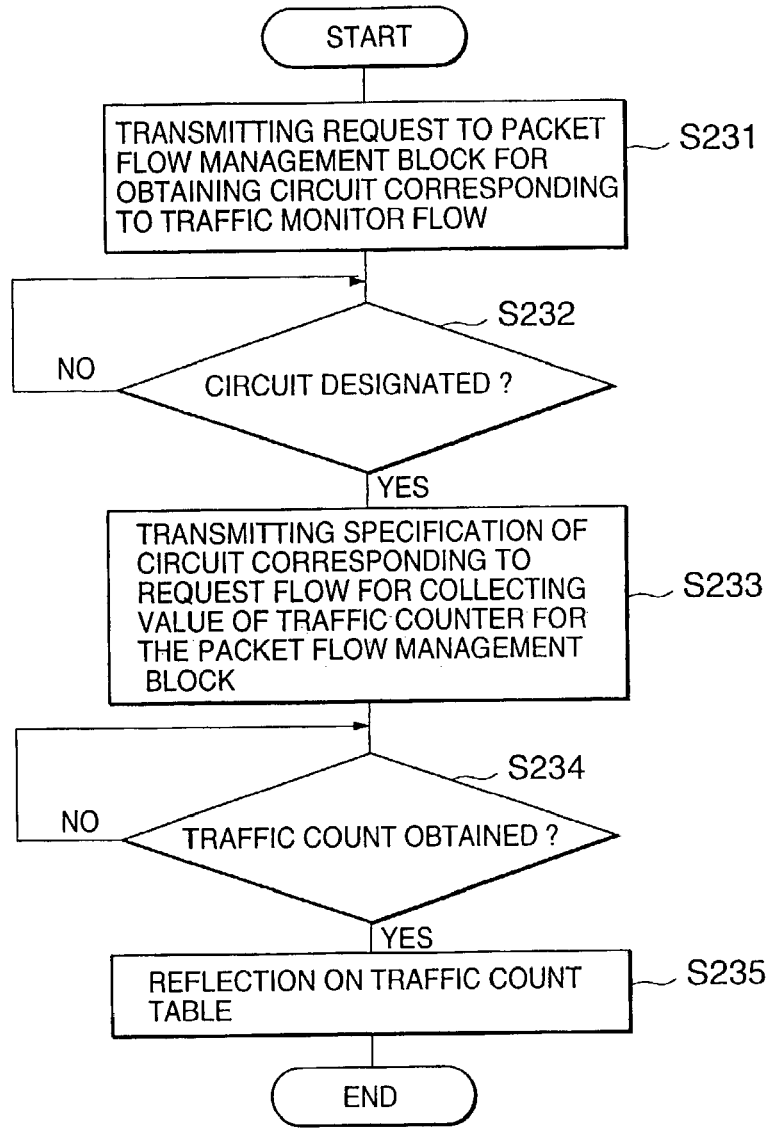

(PACKET FLOW MANAGEMENT BLOCK)

| FLOW/ CIRCUIT CORRESPONDENCE TABLE | |
|---|---|
| ADDRESS | CIRCUIT |
| A | "1" |
| B | "2" |
| C | "2" |
| C | "3" |

131

FLOW A-B

| A INPUT CIRCUIT | CAPACITY | RECEPTION COUNT | RATE | UTILIZATION RATE |
|---|---|---|---|---|
| "1" | 10Gbps | | | |
| B OUTPUT CIRCUIT | CAPACITY | TRANSMISSION COUNT | RATE | UTILIZATION RATE |
| "2" | 10Gbps | | | |

(TRAFFIC COUNTER COLLECTION BLOCK)

| FLOW A-B | | | | | |
|---|---|---|---|---|---|
| A | INPUT CIRCUIT | CAPACITY | RECEPTION COUNT | RATE | UTILIZATION RATE |
|  | "1" | 10Gbps | 90GB | 2.4Gbps | 24% |
| B | OUTPUT CIRCUIT | CAPACITY | TRANSMISSION COUNT | RATE | UTILIZATION RATE |
|  | "2" | 10Gbps | 120GB | 3.2Gbps | 32% |

(MONITOR CYCLE : 300 SECONDS)

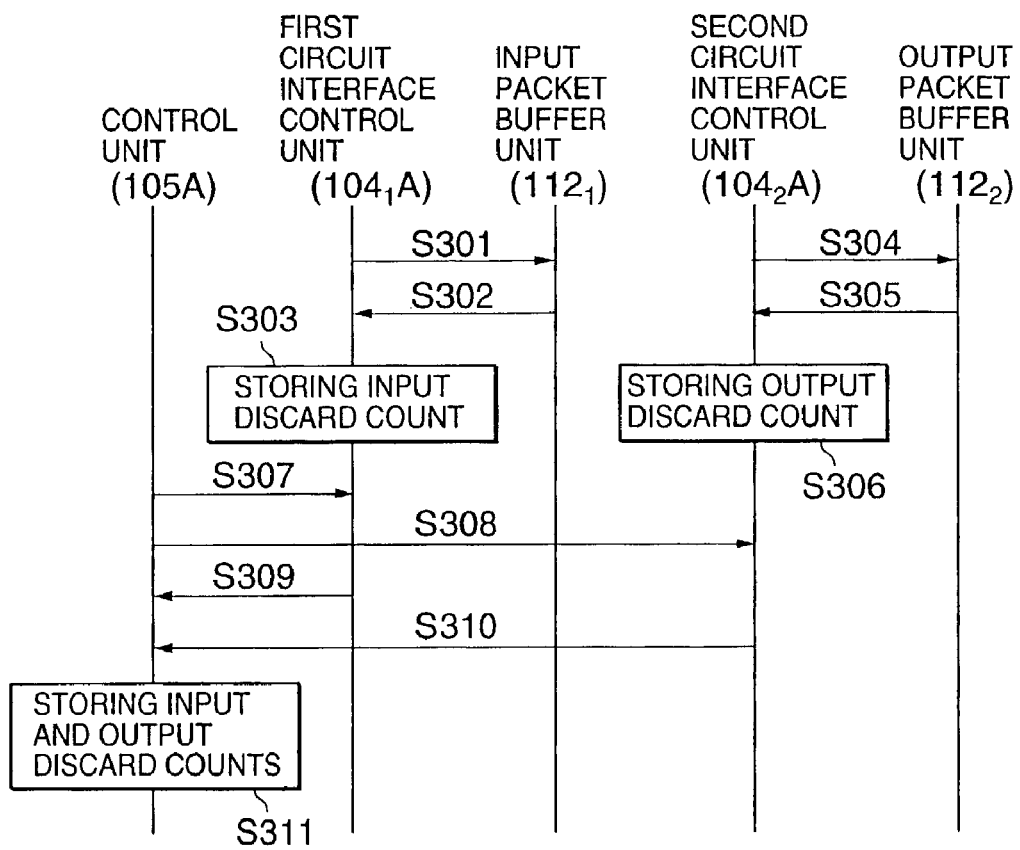

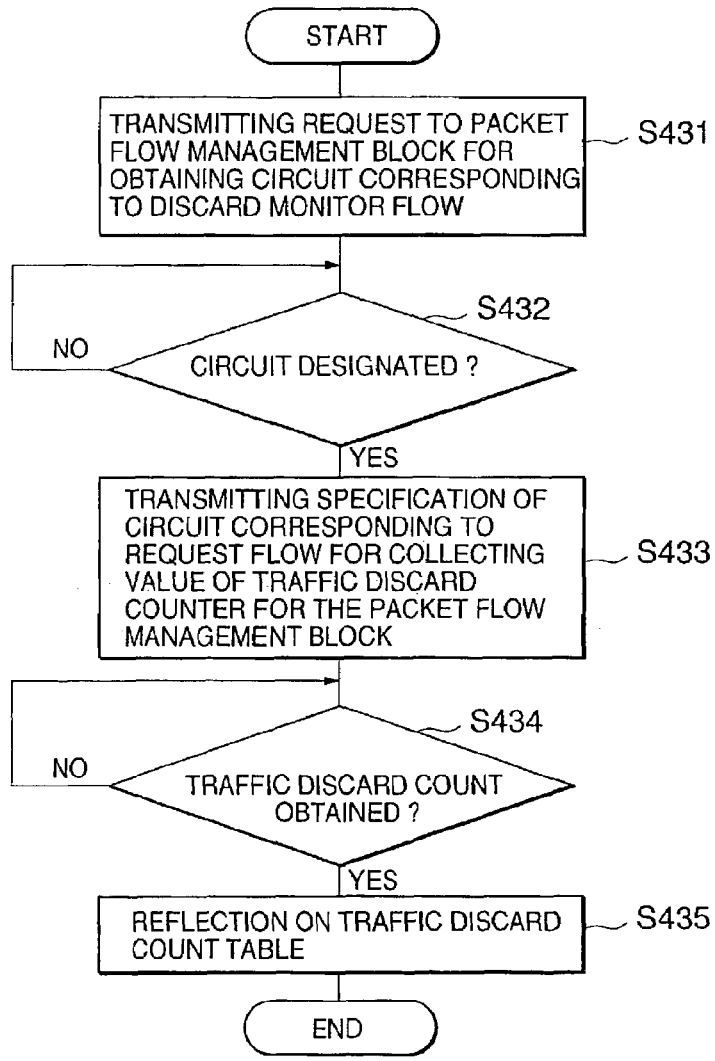

(TRAFFIC DISCARD COUNTER COLLECTION BLOCK)

331

FLOW A-B

| | | CAPACITY | RECEPTION COUNT | RATE | UTILIZATION RATE | DISCARD COUNT | DISCARD RATE |
|---|---|---|---|---|---|---|---|
| A | INPUT CIRCUIT | 10Gbps | 90GB | 2.4Gbps | 24% | 0.09MB | $10^{-6}$ |
| | "1" | | | | | | |
| B | OUTPUT CIRCUIT | CAPACITY | TRANSMISSION COUNT | RATE | UTILIZATION RATE | DISCARD COUNT | DISCARD RATE |
| | "2" | 10Gbps | 120GB | 3.2Gbps | 32% | 1.2MB | $10^{-5}$ |

US 7,719,990 B2

COMMUNICATIONS NETWORK TRAFFIC MONITOR SYSTEM

BACKGROUND OF THE INVENTION

1. Field of the Invention

The present invention relates to a traffic monitor system for monitoring traffic in a node of a core network of a communications network.

2. Description of the Related Art

FIG. 21 shows an outline of a core network in a communications network. A core network 11 is a common carrier network and includes: a plurality of edge nodes $12_1, 12_2, \ldots$ for connecting (joining or separating) a plurality of ISPs (Internet Service Providers) that are not shown in the attached drawings; and several core nodes $13_1, 13_2, \ldots$ for connecting the plurality of edge nodes $12_1, 12_2, \ldots$ For example, assume that a first communications terminal 14 and a second communications terminal 15 communicate with each other through an Internet network. In this case, a packet signal transmitted from the first communications terminal 14 reaches the first edge node $12_1$ through the ISP, reaches the second edge node $12_2$ through the first core node $13_1$, then reaches the second communications terminal 15 through another ISP. It is obvious that another path can be taken when a packet signal is transmitted from the first communications terminal 14 to the second communications terminal 15. For example, after reaching the first edge node $12_1$, the packet signal can be transmitted through second core node $13_2$.

In a communications network that uses packets, such as the Internet, it may be necessary to guarantee a predetermined communication speed by reserving a band for specific communications. To attain this, QOS (Quality Of Service) is utilized as a measurement tool. To guarantee the QOS for specific communications, it is necessary to monitor how a packet is transmitted through a switch or a node in a network.

For example, in a conventional system for monitoring a network, equipment for exchanging IP (Internet protocol) packets collects the data in the packets. Then, the flow of a specific IP packet is obtained by checking the destination IP address and the source IP address from among the collected packets.

In another conventional system for monitoring the network, the interface of the system captures IP packets. The extraction unit extracts a source address, a destination address, etc. from the IP header, transmits them to the analysis unit, and computes the total value of traffic for each path.

The number of packet signals passing through the core network 11 is very large, and the communication speed is as high as several gigabits/seconds or more. Therefore, when attempting to determine the QOS, it is impossible to individually capture the packet signals passing through the core network 11. That is, to designate the path of each packet signal in the edge nodes $12_1, 12_2, \ldots$ and core nodes $13_1, 13_2, \ldots$ in the core network 11, it is necessary to monitor each packet at a high speed, and individually store the count value of the packets for each route, which cannot be realized with the current resources.

Therefore, in the conventional technology, the guarantee of the QOS for each user or packet flow is omitted, or the size of the core network 11 is increased so that is not needed.

However, in the latter case, since the packet communications develop with a larger capacity at a higher speed, the corresponding facilities are to be extended with sufficient resources, thereby causing the problem of a difficult economic system configuration. Furthermore, the performance in each node of the core network 11 cannot be improved. If the guarantee of the QOS is to be offered, the extensibility of the nodes is correspondingly lowered.

SUMMARY OF THE INVENTION

An object of the present invention is to provide a traffic monitor system capable of monitoring the traffic of packet signals without capturing each packet signal.

To this end, a traffic monitor system for monitoring the traffic, includes a plurality of circuit interface units, each being associated with a respective pair of input and outputs for a packet signal;

a switch unit for connecting a packet signal input into a first of said circuit interface units to a second of said circuit interface units;

each of said circuit interface units having an input traffic count unit for counting input packet signals and an output traffic count unit for counting output packet signals and an input and output circuit designation unit for designating a packet flow to be monitored;

an input traffic counter collection unit for periodically obtaining a count value from said input traffic count unit in the packet flow designated by said input and output circuit designation unit;

an output traffic counter collection unit for periodically obtaining a count value from said output traffic count unit in the packet flow designated by said input and output circuit designation unit; and a monitor data storage unit for storing each count value obtained by said input traffic counter collection unit and output traffic counter collection unit.

Since in this configuration, a system not capable of capturing each packet signal can configure an economical communications system by efficiently using the resources. Furthermore, since it is not necessary to capture each packet signal, the performance of the system can be maintained with the extensibility successfully reserved.

BRIEF DESCRIPTION OF THE DRAWINGS

The above and other objects, features and advantages of the present invention will become more apparent from the following detailed description when taken in conjunction with the accompanying drawings wherein:

FIG. 2 shows an-example of a point-to-point packet flow;

FIG. 3 shows the process of collecting a traffic count according to an embodiment of the present invention;

FIG. 4 shows the configuration of a traffic count table provided in the control unit according to an embodiment of the present invention;

FIG. 5 is a flowchart of the control of the traffic counter monitor block according to an embodiment of the present invention;

FIG. 6 shows the contents of the traffic count table at the initial time point;

FIG. 13 shows the process of collecting a discard count in the traffic monitor system as a variation of an embodiment of the present invention;

FIG. 14 shows the configuration of the input/output traffic discard count table provided in the control unit as a variation of an embodiment of the present invention;

FIG. 15 is a flowchart showing the control of the traffic discard counter monitor block in a variation of an embodiment of the present invention;

FIG. 16 shows the contents of the traffic discard count table at the initial time point in a variation of an embodiment of the present invention;

DETAILED DESCRIPTION OF THE PREFERRED EMBODIMENT

A traffic monitor system embodying the present invention will be described with reference to FIG. 1 through FIG. 20.

Figure 1:
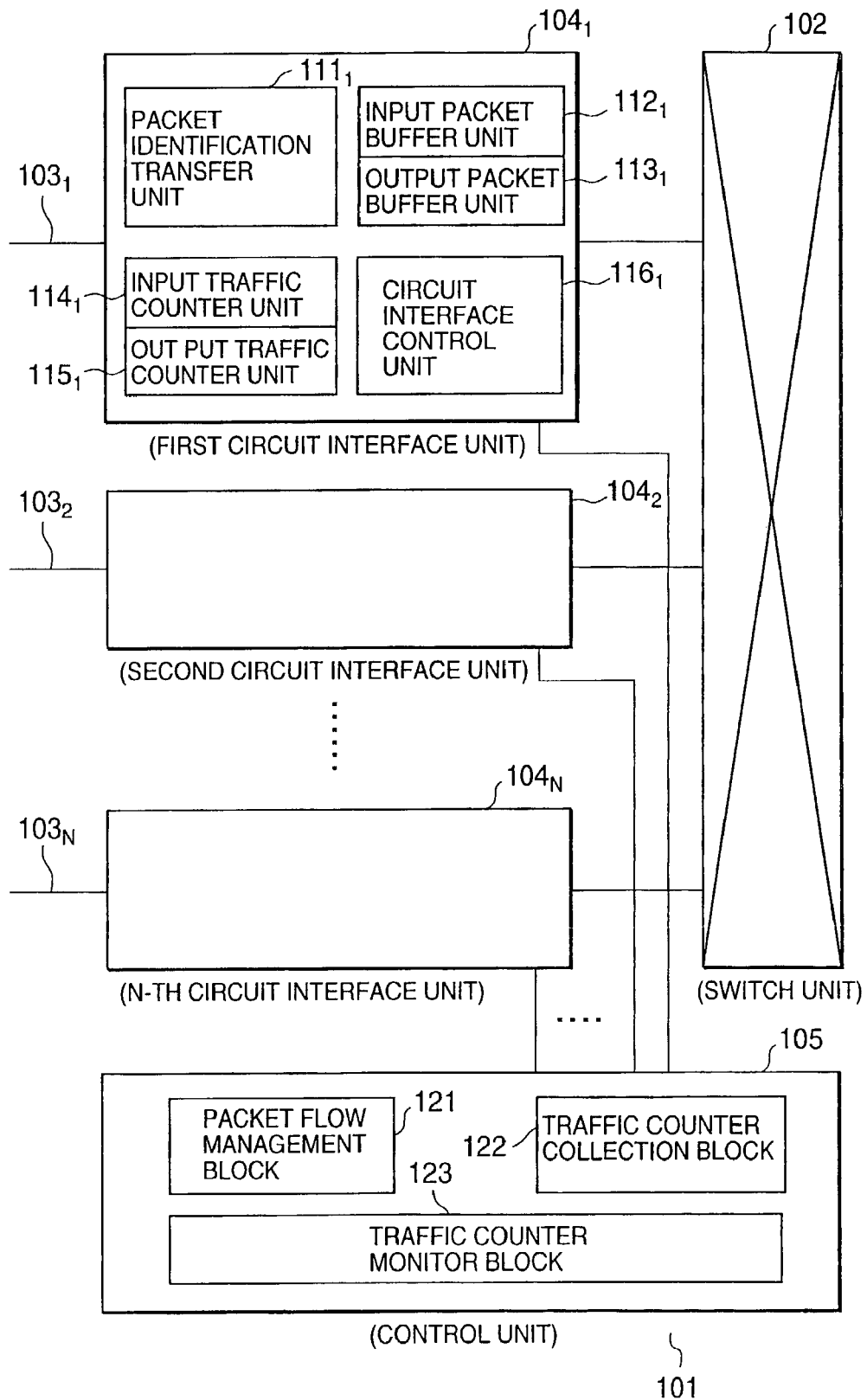
FIG. 1 is a block diagram showing the configuration of a core network node using a traffic monitor system according to an embodiment of the present invention.

FIG. 1 shows a configuration of the core network node using the traffic monitor system according to an embodiment of the present invention. A core network node 101 comprises a switch unit 102 for input and output and first to N-th circuit interface units $104_1$ to $104_N$ corresponding to first to N-th circuits $103_1$ to $103_N$. The first to N-th circuit interface units $104_1$ to $104_N$ are connected to the switch unit 102, and to a control unit 105 for controlling operation of the system with software. In the first circuit interface unit $104_1$, a packet identification transfer unit $111_1$ for identifying and transferring an input packet, an input packet buffer unit $112_1$ for temporarily storing an input packet, an output packet buffer unit $113_1$ for temporarily storing an output packet, an input traffic counter unit $114_1$ for counting the traffic relating to input packets, an output traffic counter unit $115_1$ for counting the traffic relating to an output packet, and a circuit interface control unit $116_1$ for control in the first circuit interface unit $104_1$. FIG. 1 practically shows only the internal configuration of the first circuit interface unit $104_1$, but the similar internal configuration is designed for the second to N-th circuit interfaces $104_2$ to $104_N$.

The control unit 105 comprises a CPU (central processing unit) not shown in the attached drawings, and a storage medium for storing a control program and various data, and realizes some function blocks by the CPU executing the control program. According to the present embodiment, control unit 105 includes a packet flow management block 121 for managing a packet flow, a traffic counter collection block 122 for collecting a traffic counter, and a traffic counter monitor block 123 for monitoring a traffic counter.

In the core network node 101 with the above mentioned configuration, for example, the input traffic counter unit $114_1$ and the output traffic counter unit $115_1$ in the first circuit interface unit $104_1$ have the function of inputting, that is, receiving a packet, and outputting, that is, transmitting, a packet in the first circuit $103_1$, and counting the amount of data (number of bytes) in a packet. Therefore, the data in a packet is transmitted to the switch unit 102 in a state in which the respective traffic is grasped by the first to N-th circuit interface units $104_1$ to $104_N$, and output to an output circuit. The input traffic counter unit $114_1$ and output traffic counter unit $115_1$ are conventional counters, and have not been specifically prepared for the present embodiments.

The packet flow management block 121 in the control unit 105 for exercising control by software has the function of management of the correspondence between a packet flow and the first to N-th circuits $103_1$ to $103_N$. The traffic counter collection block 122 has the function of storing and managing a traffic counter collected from the circuit interface control units $116_1$ to $116_N$. The traffic counter monitor block 123 has the function of storing and managing a traffic counter in a circuit unit corresponding to the packet flow. At an instruction from the control unit 105, a specified unit in the first to N-th circuit interface units $104_1$ to $104_N$, notifies control unit 105 of the input and output traffic count. The traffic counter collection block 122 stores traffic counts respectively corresponding to the first to N-th circuits $103_1$ to $103_N$ from the traffic counts reported by the first to N-th circuit interface units $104_1$ to $104_N$.

The traffic counter monitor block 123 inquires of the packet flow management block 121 about the correspondence between a packet flow and the first to N-th circuits $103_1$ to $103_N$ and refers to the correspondence table between the packet flow and the input and output circuit not shown in the attached drawings. Then, the correspondence for each of the input and output circuits 103 of a traffic count is obtained, and the amount of data or the amount of discard of the transmitted and received packets in the core network node 101 can be obtained. Thus, by associating the count in the unit of input and output circuit 103 with a packet flow in the control unit 105, a traffic count corresponding to the packet flow designated in the core network node 101 can be collected and monitored. This process is further described below in detail.

FIG. 2 shows an example of a point-to-point packet flow. Assume that a source address is A, and a destination address is B, and that a packet is input from the first circuit $103_1$ to the first circuit interface unit $104_1$, and the packet is output to the second circuit $103_2$ now functioning as an output circuit through the switch unit 102 and the second circuit interface unit $104_2$. At this time, as the traffic of the packet flow A-B, the first circuit interface unit $104_1$ collects the input traffic count counted by the input traffic counter unit $114_1$ as shown in FIG. 1. Furthermore, the second circuit interface unit $104_2$ collects an output traffic count counted by the output traffic counter unit $115_2$.

All packets input into the first circuit interface unit $104_1$ are not always output to the second circuit $103_2$ through the second circuit interface unit $104_2$. For example, they can be transmitted to a destination address other than the destination address B through the third circuit $103_3$. Furthermore, a packet output from the second circuit interface unit $104_2$ to the second circuit $103_2$ is not always addressed to the destination address B. However, the packet flow A-B is necessarily counted by the input traffic counter unit $114_1$ of the first circuit interface unit $104_1$, passes through the second circuit interface unit $104_2$, and is counted by the output traffic counter unit $115_2$. Therefore, according to the present embodiment, the packet flow A-B is monitored with the count by the input traffic counter unit $114_1$ and the output traffic counter unit $115_2$, and the utilization rates of the first and second circuits $103_1$ and $103_2$, etc. taken into account.

FIG. 3 shows the collecting process of the input (received) and output (transmitted) traffic count. When the packet flow A-B is monitored, the control unit 105 shown in FIG. 1 collects the reception count collected and stored by the input traffic counter unit $114_1$ in the first circuit interface unit $104_1$, and collects the transmission count collected and stored by the output traffic counter unit $115_2$ in the second circuit interface unit $104_2$.

Regardless of the collection by the control unit 105, upon receipt of a packet by the first circuit interface unit $104_1$ in the first circuit $103_1$, the input traffic counter unit $114_1$ collects and counts the packet(step S201). Similarly, when the second circuit interface unit $104_2$ outputs the packet, the output traffic counter unit $115_2$ collects and counts the packet (step S202). These count values are collected respectively by the first or second circuit interface unit $104_1$ or $104_2$ (steps S203 and S204). Thus, the first and second circuit interface units $104_1$ and $104_2$ continue the process of updating and storing each reception count or transmission count (steps S205 and S206).

Although not shown in FIG. 3, the first circuit interface unit $104_1$ similarly collects and stores the transmission count, and the second circuit interface unit $104_2$ similarly collects and stores the reception count. However, since the count values are not used in monitoring the point-to-point packet flow A-B, they are not shown in FIG. 3. Similarly, the third to N-th circuit interface units $104_3$ to $104_N$ collect and store the reception and transmission count. Since they are not used in monitoring the point-to-point packet flow A-B, they are not shown in FIG. 3.

When the point-to-point packet flow A-B shown in FIG. 2 is monitored as indicated by the example, the control unit 105 shown in FIG. 1 requests the first and second circuit interface units $104_1$ and $104_2$ to report on the count stored in them (steps S207 and S208). Based on this, the first and second circuit interface units $104_1$ and $104_2$ report on the counts (steps S209 and S210). Thus, the reception and transmission counts for monitor of the packet flow A-B in the first and second circuit interface units $104_1$ and $104_2$ are stored in the control unit (step S211).

The collection cycle of the reception and transmission counts set by the control unit 105 for the first and second circuit interface units $104_1$ and $104_2$ in association with the packet flow A-B is set at intervals at which the counters not shown in the attached drawings but provided for the input traffic count (reception count) and output traffic count (transmission count) in the first and second circuit interface units $104_1$ and $104_2$ corresponding to the first or second circuit $103_1$ or $103_2$ do not overflow. That is, the control unit 105 collects and stores each count from the first and second circuits $103_1$ and $103_2$ in the cycle set depending on the bit widths of the counters.

FIG. 4 shows a configuration of a traffic count table 131 provided in the control unit 105. A traffic count table 131 stores any circuit to be monitored from among the first to N-th circuits $103_1$ to $103_N$ using the reception count or transmission count in a table form, and the predetermined storage area in the above mentioned storage medium is assigned therefor. The reception count refers to a count value of the input traffic counter unit 114 in the corresponding circuit interface unit 104, and the transmission count refers to a count value of the output traffic count unit 115 in the corresponding circuit interface unit 104.

Described below are a change with time of the contents of the traffic count table 131 and the operations of the traffic monitor system.

FIG. 5 shows a flow of the control of the traffic counter monitor block 123. In the control unit 105 shown in FIG. 1, the traffic counter monitor block 123 outputs a request to the packet flow management block 121 for obtaining a circuit corresponding to a traffic monitor flow (step S231). Then, the traffic counter monitor block 123 waits for an answer designating a circuit from the packet flow management block 121 (step S232).

FIG. 6 shows the contents of the traffic count table at an initial time. In this example, the case in which a request is issued to monitor the above mentioned packet flow A-B is described. The traffic count table 131 is provided in the traffic counter monitor block 123 and contains at the initial state the input circuit, the capacity, the reception count, the rate, and the utilization rate for the source address A, and the output circuit, the capacity, the transmission count, the rate, and the utilization rate for the destination address B as unfilled.

Figures 7, 8, 9:
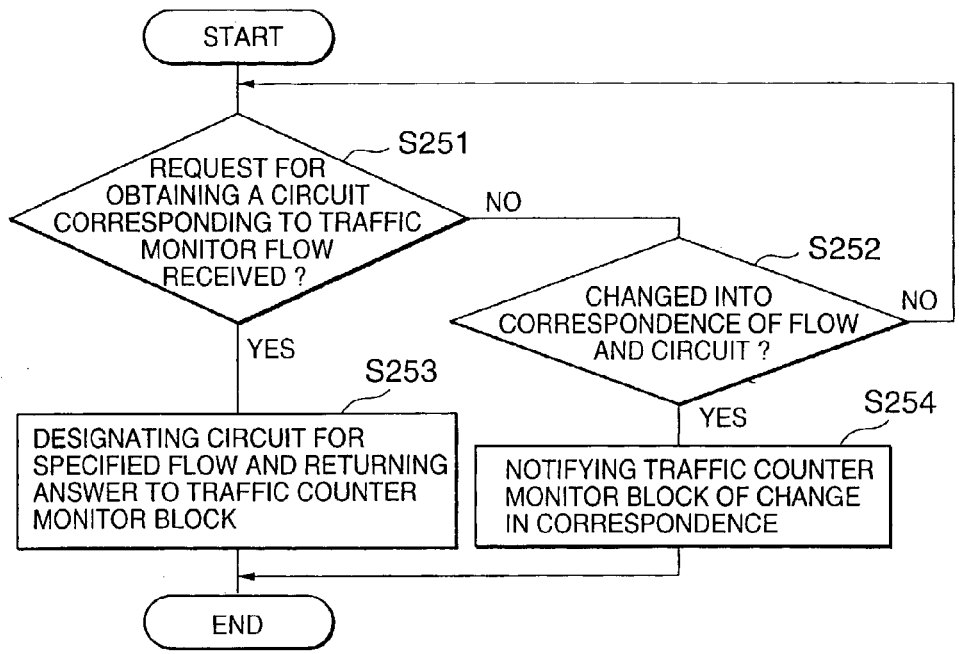
FIG. 7 shows the contents of the traffic count table at the initial time point.
FIG. 8 shows the flow/circuit corresponding table according to an embodiment of the present invention.
FIG. 9 shows a change in the traffic count table by an answer of the packet flow management block according to an embodiment of the present invention.

FIG. 7 shows the state of controlling the packet flow management block 121. In the packet flow management block 121 shown in FIG. 1, the state of receiving a request for obtaining a circuit corresponding to the traffic monitor flow from the traffic counter monitor block 123 is monitored (step S251), and the flow and the correspondence of the circuit 103 and its change are monitored (step S252). Therefore, upon receipt of the request for obtaining a circuit corresponding to the traffic monitor flow (Y in step S251), the packet flow management block 121 designates the circuit for the specified flow, and returns it to the traffic counter monitor block 123. In this example, since a request to designate a circuit for the packet flow A-B is issued, the packet flow management block 121 returns an answer (step S253). After the answer, for example, if the route of a packet is changed to solve the problem of a faulty circuit, etc., the correspondence becomes different. Therefore, if the case occurs (Y in step S252), then, as in the correspondence change in the flow and the circuit 103, the traffic counter monitor block 123 is notified of the information (step S254).

FIG. 8 shows an example of a flow/circuit correspondence table 141 stored in the packet flow management block 121. Based on the answer of the packet flow management block 121 described above in step S253 shown in FIG. 7, the flow/circuit correspondence table 141 describes the correspondence between the addresses and the circuit. From the flow/circuit correspondence table 141, the circuit for the packet flow A-B can be the first circuit $103_1$ and the second circuit $103_2$.

FIG. 9 shows a change in the traffic count table by an answer from the packet flow management block described in FIG. 7. In this example, the circuits about the packet flow A-B are the first and second circuit $103_1$ and $103_2$, the traffic count table 131 describes the correspondence between them.

Back in FIG. 5, when the information designating the circuit about the packet flow A-B is transmitted from the packet flow management block 121 (Y in step S232), the traffic counter monitor block 123 specifies a circuit corresponding to a request flow for collecting a value of a traffic counter for the packet flow management block 121 (step S233). In this example, based on the traffic count table 131 shown in FIG. 9 as the corresponding circuit, the first and second circuit $103_1$ and $103_2$ are specified. The traffic counter monitor block 123 awaits the traffic count collected by the specified circuits from the traffic counter collection block 122 (step S234).

Figures 10, 11:
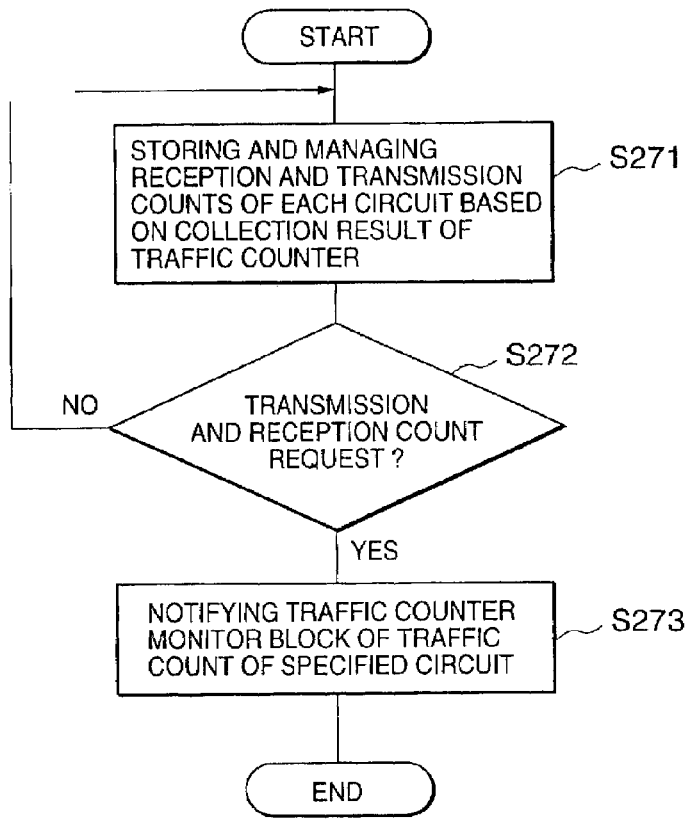
FIG. 10 is a flowchart showing the state of controlling the traffic count collection block according to an embodiment of the present invention.
FIG. 11 shows the contents of the traffic count table at the time when a traffic count is received according to an embodiment of the present invention.

FIG. 10 shows the state of controlling the traffic counter collection block 122. The traffic counter collection block 122 stores and manages the transmission and reception counts of each circuit based on the collection result of the traffic counter (step S271). When a request to obtain a traffic count is received from the traffic counter monitor block 123 (Y in step S272), the traffic counter monitor block 123 is notified of the traffic count of the specified circuit (step S273).

When the traffic counter monitor block 123 obtains a traffic count of the circuit specified by the traffic counter collection block 122 (Y in step S234 shown in FIG. 5), it is reflected on the traffic count table 131 (step S235).

FIG. 11 shows a change in the traffic count table by the above mentioned processes. As a result of obtaining the traffic count about the first and second circuits $103_1$ and $103_2$ from the traffic counter collection block 122, the traffic count table 131 stores the reception count and the transmission count. The collection cycle of the transmission and reception counts is set to 300 seconds in this example. For example, since the reception count of the first circuit $103_1$ is 90 GB, the reception rate per second is 2.4 Gbps (bits/second). Since the capacity of the input circuit is 10 Gbps, the utilization rate of the circuit is 24%.

On the other hand, since the transmission count of the second circuit $103_2$ is 120 GB, the transmission rate per second is 3.2 Gbps. Since the capacity of the output circuit is 10 Gbps, the utilization rate of the circuit is 32%.

Thus, the circuit utilization rate by the packet flow A-B in the first and second circuits $103_1$ and $103_2$ is at most 24% which is a smaller value between 24% and 32%. There is still room in the circuit utilization rate. Therefore, it is not necessary at present to switch the packet flow A-B into another circuit. On the other hand, for example, if the transmission count of the second circuit $103_2$ is large and the utilization rate of the circuit is overflowing although the reception count of the first circuit $103_1$ is the same as present example, then the control unit 105 searches for another path through which a packet can be transmitted to the destination address B through the circuit 103 other than the second circuit $103_2$, thereby switching into this path to guarantee the QOS.

Figure 12:
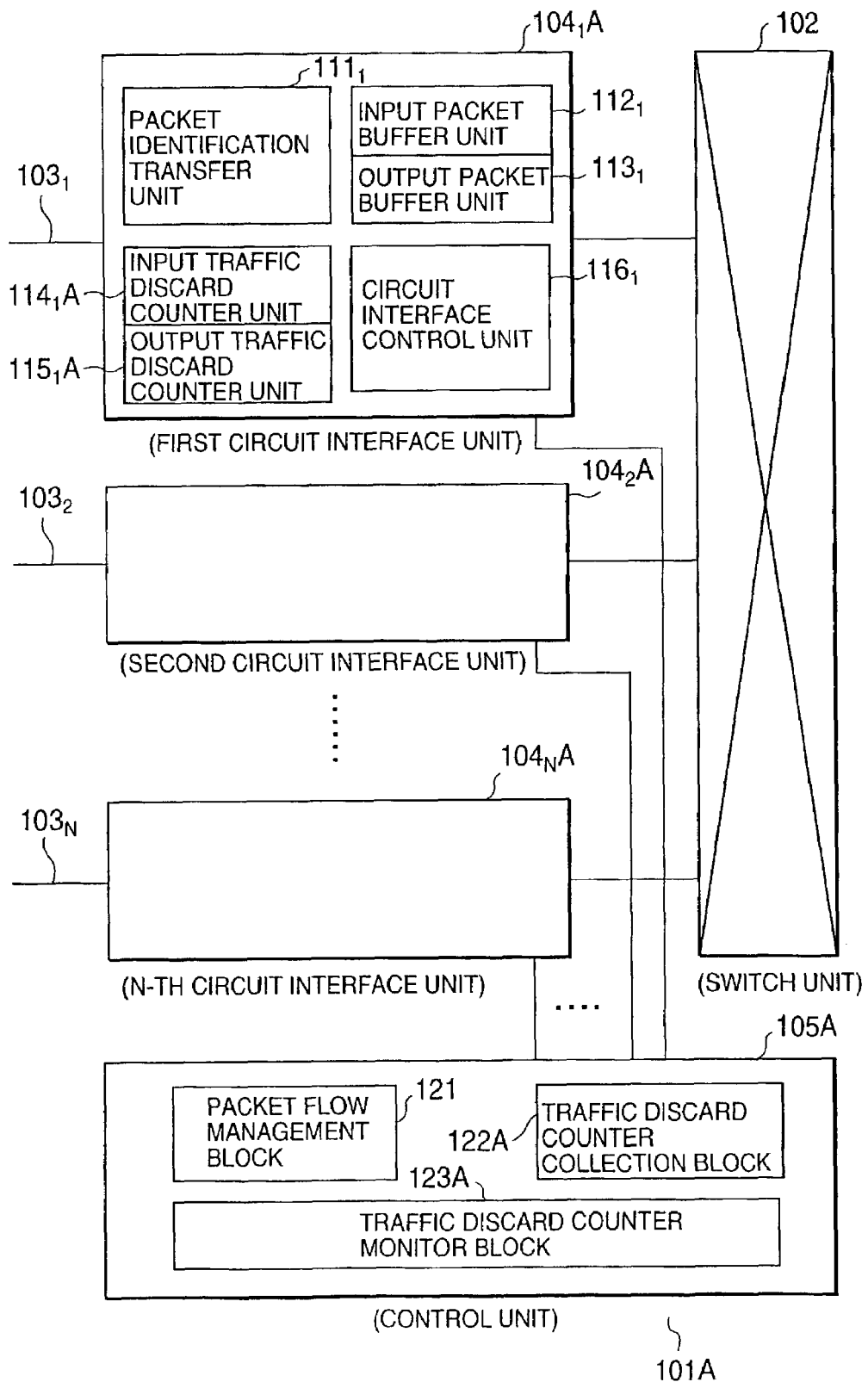
FIG. 12 is a block diagram showing the core network node in a variation of an embodiment of the present invention.

FIG. 12 shows a core network node according to a variation of the present invention. In the core network node 101A of the variation, the units also shown in FIG. 1 are assigned the same reference numerals, and the detailed explanation is omitted here. The core network node 101A is provided with first to N-th circuit interface units $104_1$A to $104_N$A corresponding to the first to N-th circuit interface units $104_1$ to $104_N$ in the above mentioned embodiment. Each of the first to N-th circuit interface units $104_1$A to $104_N$A is connected to the switch unit 102, and the control unit 105A for controlling operation of the system with software. The first circuit interface unit $104_1$A is provided with the input traffic discard counter unit $114_1$A relating to the input packets to be discarded, and the output traffic discard counter unit $115_1$A relating to the output packets to be discarded. In this example, only the internal configuration of the first circuit interface unit $104_1$A is shown, but the similar internal configuration is designed for the second to N-th circuit interfaces $104_2$A to $104_N$A.

The control unit 105A comprises a storage medium for storing a CPU, a control program, and various types of data although not shown in the attached drawings, and realizes some function blocks by the CPU executing the control program. In this variation, the control unit 105A includes the packet flow management block 121 for managing a packet flow, a traffic discard counter collection block 122A for collecting a traffic discard counter, and a traffic discard counter monitor block 123A for monitoring the traffic discard counter.

FIG. 13 corresponds to FIG. 3 shown in the above mentioned embodiments, and shows the process of collecting a discard count in the traffic monitor system according to the variation. In the control unit 105A shown in FIG. 12, the first circuit interface unit $104_1$A accumulates packets in the input packet buffer unit $112_1$ (step S301), and receives a notification if there is a packet to be discarded (step S302). The input traffic discard counter unit $114_1$A stores as an input discard count the number of packets input based on the notification and discarded without being output (step S303).

On the other hand, the second circuit interface unit $104_2$A in the point-to-point packet flow shown in FIG. 2 accumulates the packets to be output to the output packet buffer unit $113_1$ (step S304). If there is a packet to be discarded, the notification is transmitted to the second circuit interface unit $104_2$A (step S305). The second circuit interface unit $104_2$ stores the number of packets to be discarded by the output traffic discard counter unit $115_2$A as an output discard count (step S306).

The control unit 105A requests the first and second circuit interface units $104_1$A and $104_2$A to report on the stored discard count at a predetermined time intervals to monitor the point-to-point packet flow shown in FIG. 2 (steps S307 and S308). Thus, the first and second circuit interface units $104_1$A and $104_2$A report on these discard counts (steps S309 and S310). Thus, the input and output discard counts about the packet flow A-B in the first and second circuit interface units $104_1$A and $104_2$A are stored in the control unit (step S311).

The collection cycle of the input and output discard counts set about the first and second circuit interface units $104_1$A and $104_2$A by the control unit 105A corresponding to the packet flow A-B is determined such that discard counters (not shown in the attached drawings) provided for the input discard count and the output discard count in the first and second circuit interface units $104_1$A and $104_2$A corresponding to the first and second circuits $103_1$ and $103_2$ cannot overflow. That is, the control unit 105A collects and stores each discard count from the first and second circuits $103_1$ and $103_2$ in the cycle set depending on the bit width of the discard counters.

FIG. 14 shows the configuration of the input/output traffic discard count table 321 provided in the control unit 105A. An input/output traffic discard count table 321 stores the collection result collected by the control unit 105A in a table format, and a predetermined storage area in the above mentioned storage medium is assigned therefor. The input/output traffic discard count table 321 stores the input discard count and the output discard count for each of the first to N-th circuits $103_1$ to $103_N$. Then, the change in the contents of the input/output traffic discard count table 321 and the operations of the traffic monitor system are described below further in detail.

FIG. 15 shows a flow of the control of the traffic discard counter monitor block 123A. In the control unit 105A shown in FIG. 12, the traffic discard counter monitor block 123A outputs a request to the packet flow management block 121 for obtaining a circuit corresponding to a discard monitor flow (step S431). Then, the traffic discard counter monitor block 123A waits for an answer designating a circuit from the packet flow management block 121 (step S432).

FIG. 16 shows the contents of the traffic discard count table at an initial time. In this example, the case in which a request is issued to monitor the above mentioned packet flow A-B is described. The traffic discard count table 331 is provided in the traffic discard counter monitor block 123A and contains at the initial state the input circuit, the capacity, the reception count, the rate, the utilization rate, the discard count, and the discard rate for the source address A, and the output circuit, the capacity, the transmission count, the rate, the utilization rate, the discard count, and the discard rate for the destination address B as unfilled.

Figures 17, 18:
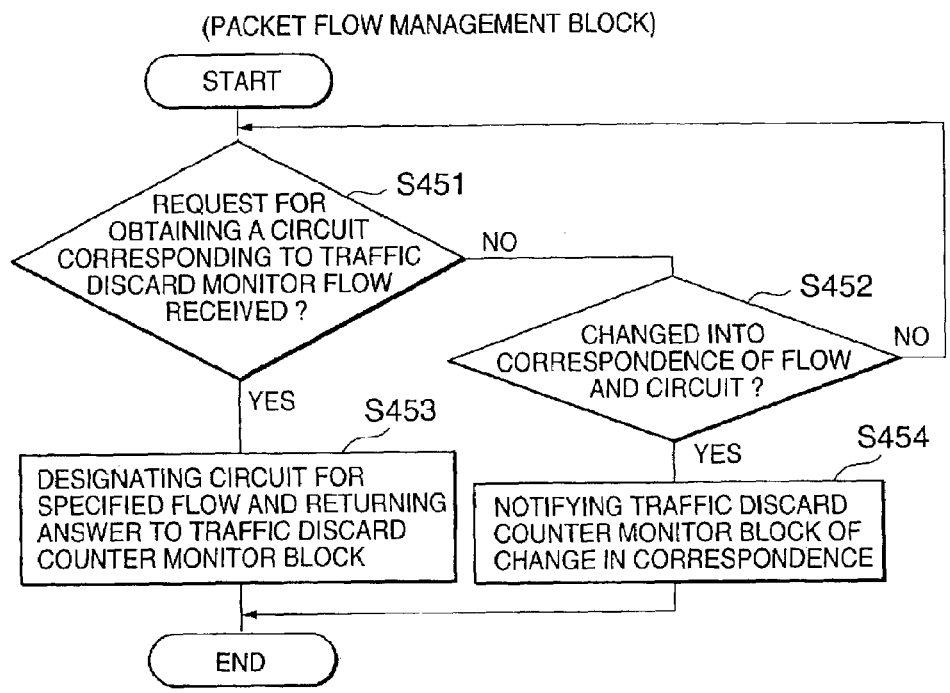
FIG. 17 is a flowchart of the state of controlling the packet flow management block in a variation of an embodiment of the present invention.
FIG. 18 is an explanatory view of a change in the traffic discard count table by an answer from the packet flow management block shown in FIG. 17.

FIG. 17 shows the state of controlling the packet flow management block 121 in the variation. In the packet flow management block 121 shown in FIG. 12, the state of receiving a request for obtaining a circuit corresponding to the traffic discard monitor flow from the traffic discard counter monitor block 123A is monitored (step S451), and the flow and the correspondence of the circuit 103 and its change are monitored (step S452). Therefore, upon receipt of the request for obtaining a circuit corresponding to the traffic discard monitor flow (Y in step S451), the packet flow management block 121 designates the circuit for the specified flow, and returns it to the traffic discard counter monitor block 123A. In this example, since a request to designate a circuit for the packet flow A-B is issued, the packet flow management block 121 returns an answer (step S453) After the answer, for example, if the route of a packet is changed to solve the problem of a faulty circuit, etc., the correspondence becomes different. Therefore, if the case occurs (Y in step S452), then, as in the correspondence change in the flow and the circuit 103, the traffic discard counter monitor block 123A is notified of the information (step S454).

Also in this variation, the packet flow management block 121 is provided with the flow/circuit correspondence table 141 shown in FIG. 8. Therefore, the packet flow management block 121 returns an answer from the flow/circuit correspondence table 141 that the circuits of the packet flow A-B are the first and second circuits $103_1$ and $103_2$.

FIG. 18 shows a change in the traffic discard count table by an answer of the packet flow management block by referring to FIG. 17. In this example, the circuits of the packet flow A-B are the first and second circuits $103_1$ and $103_2$. Therefore, the traffic discard count table 331 describes the correspondence between them.

Back in FIG. 15, when the information designating the circuit about the packet flow A-B is transmitted from the packet flow management block 121 (Y in step S432), the traffic discard counter monitor block 123A specifies a circuit corresponding to a request flow for collecting a value of a traffic discard counter for the packet flow management block 121 (step S433). In this example, based on the traffic discard count table 331 shown in FIG. 18 as the corresponding circuit, the first and second circuit $103_1$ and $103_2$ are specified. The traffic discard counter monitor block 123A awaits the traffic discard count collected by the specified circuits from the traffic discard counter collection block 122A (step S434).

Figures 19, 20:
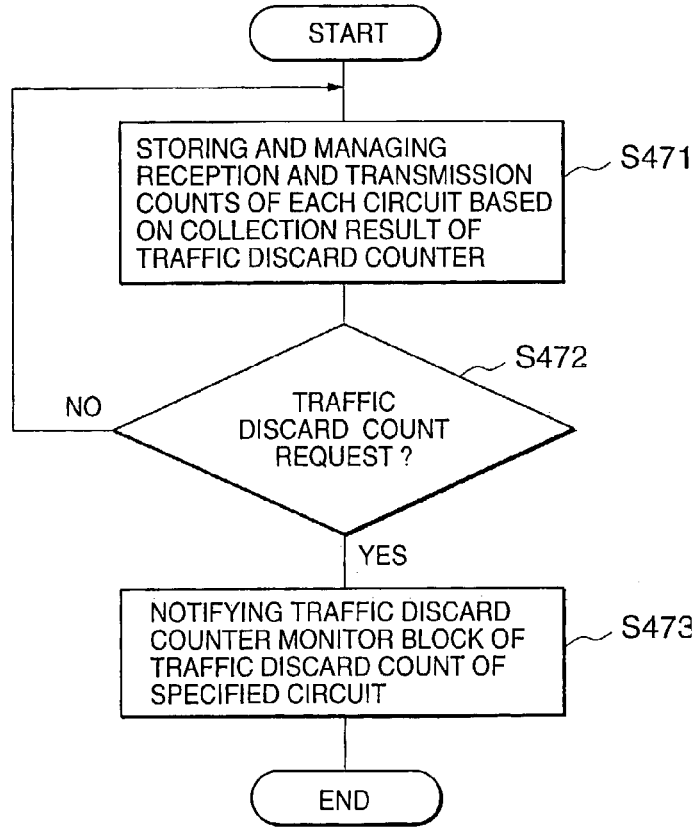
FIG. 19 is a flowchart showing the control of the traffic discard counter collection block in a variation of an embodiment of the present invention.
FIG. 20 shows the contents of the traffic discard count table at the time point when a traffic discard count is received in a variation of an embodiment of the present invention.
Figure 21:
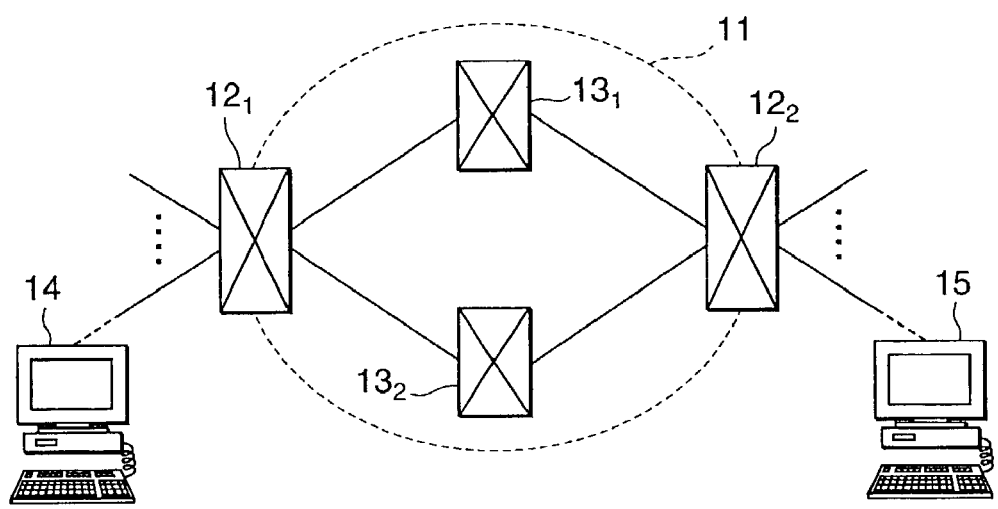
FIG. 21 shows the configuration of a core network in a conventional communications network.

FIG. 19 shows the state of controlling the traffic discard counter collection block 122A. The traffic discard counter collection block 122A stores and manages the input and output discard counts of each circuit based on the collection result of the traffic discard counter (step S471). When a request to obtain a traffic discard count is received from the traffic discard counter monitor block 123A (Y in step S472), the traffic discard counter monitor block 123A is notified of the traffic discard count of the specified circuit (step S473).

When the traffic discard counter monitor block 123A obtains a traffic count of the circuit specified by the traffic discard counter collection block 122A (Y in step S434 shown in FIG. 5), it is reflected on the traffic discard count table 331 (step S435).

FIG. 20 shows a change on the traffic discard count table by the above mentioned processes. As a result of obtaining the traffic discard count about the first and second circuits $103_1$ and $103_2$ from the traffic discard counter collection block 122A, the traffic discard count table 331 stores the input discard count and the output discard count. The collection cycle of the input and output counts is set to 300 seconds in this example. For example, since the input (reception) discard count of the first circuit $103_1$ is 90 GB, the reception rate per second is 2.4 Gbps. Since the capacity of the input circuit is 10 Gbps, the utilization rate of the circuit is 24%. Assuming that the discard count for the input circuit is 0.09 MB, the ratio to the reception count of 90 GB is computed and the discard rate is $10^{-6}$. Similarly, the discard rate for the output circuit is $10^{-5}$. Therefore, as described in the above mentioned embodiments, by referring to the discard rates, etc. of the circuits $103_1$ and $103_2$, a specific packet flow is monitored and a route is to be switched.

As described above about the embodiments and variations, the core network nodes 101 and the 101A can monitor the circuits by obtaining data of the utilization rate, the discard rate, etc. of the circuits by specifying a flow to be monitored, enabling an efficient and delicate monitor.

However, in the embodiments and variations, there is shown an example of monitoring the specific packet flow, and it is obvious that various modes can be taken in monitoring any of the packets. For example, the control units 105 and 105A can sequentially monitor only some of the requested packet flows, and can sequentially check other packet flows not being monitored or controlled by the core network nodes 101 and 101A when there is room for the monitor control to perform some other processes. The packet flows on which large transmission or reception count values have been computed, or the packet flows which have indicated high utilization rates or discard rates can be specifically monitored.

According to the embodiments of the present invention, the monitor of traffic in the core network node has been described in detail, but the present invention can also be applied to the monitor of other networks having a large number of variations of flows realized relative to the resources.

The present invention can provide the following benefit. In the invention according to claim 1 and claim 2, a system not capable of capturing each packet signal can configure an economical communications system by efficiently using the resources. Furthermore, since it is not necessary to capture each packet signal, the performance of the system can be maintained with the extensibility successfully reserved.

In the invention according to claim 3, in addition to the count values from the input traffic count unit and output traffic count unit according to claim 1 of the present invention, the count values from the input discard traffic count unit and output discard traffic count unit are obtained in a specific packet flow as set forth in claim 2 of the present invention. Therefore, the effects of the inventions according to claims 1 and 2 can be obtained, and the monitor precision can be improved.

While this invention has been described with reference to a certain preferred embodiment, it is to be understood that the subject matter encompassed by the invention is not limited to this specific embodiment. Instead it is intended for the subject matter of the invention to include all such alternatives, modifications and equivalents as can be included within the spirit and scope of the following claims.

What is claimed is:

1. A traffic monitor system for monitoring traffic in a communications network, comprising:

a plurality of circuit interface units, each being associated with a respective one of plural circuits and having a respective pair of input and outputs for a packet signal;

a switch unit for connecting a packet signal input into a first of said circuit interface units to a second of said circuit interface units;

each of said circuit interface units having an input traffic count unit for counting input packet signals without capturing each of the input packet signals and an output traffic count unit for counting output packet signals without capturing each of the output packet signals;

an input traffic counter collection unit for periodically obtaining a count value from said input traffic count unit;

an output traffic counter collection unit for periodically obtaining a count value from said output traffic count unit;

a packet flow monitoring unit for designating one of said plural circuits; and a monitor data storage unit for storing count values obtained by said input traffic counter collection unit and output traffic counter collection unit to obtain a traffic count corresponding to the one of said plural circuits designated by said packet flow monitoring unit.

2. The traffic monitor system, as claimed in claim 1, further comprising a circuit utilization rate computation unit for computing a utilization rate of the designated one of said plural circuits using an input count value or an output count value stored in said monitor data storage unit.

3. A traffic monitor system for monitoring traffic in a communications network, comprising:

a plurality of circuit interface units, each being associated with a respective one of plural circuits and having a respective pair of input and outputs for a packet signal;

a switch unit for connecting a packet signal input into a first of said circuit interface units to a second of said circuit interface units;

each of said circuit interface units having an input discard traffic count unit for counting input packet signals that have been discarded without capturing each of the input packet signals and an output discard traffic count unit for counting output packet signals that have been discarded without capturing each of the output packet signals;

an input discard traffic counter collection unit for periodically obtaining a count value from said input discard traffic count unit;

an output discard traffic counter collection unit for periodically obtaining a count value from said output discard traffic count unit;

a packet flow monitoring unit for designating one of said plural circuits; and a monitor data storage unit for storing count values obtained by said input discard traffic counter collection unit and output discard traffic counter collection unit to obtain a discard traffic count corresponding to the one of said plural circuits designated by said packet flow monitoring unit.

4. The traffic monitor system, as claimed in claim 3, further comprising a circuit discard rate computation unit for computing a discard rate of the designated one of said plural circuits using an input discard count value or an output discard count value stored in said monitor data storage unit.

* * * * *